July 4, 1950   F. RIEBER   2,513,678
FREQUENCY CONTROLLED WEIGHING DEVICE
Filed Jan. 29, 1944   2 Sheets-Sheet 1

INVENTOR.
FRANK RIEBER
BY
Willis B Rice

July 4, 1950 F. RIEBER 2,513,678
FREQUENCY CONTROLLED WEIGHING DEVICE
Filed Jan. 29, 1944 2 Sheets-Sheet 2
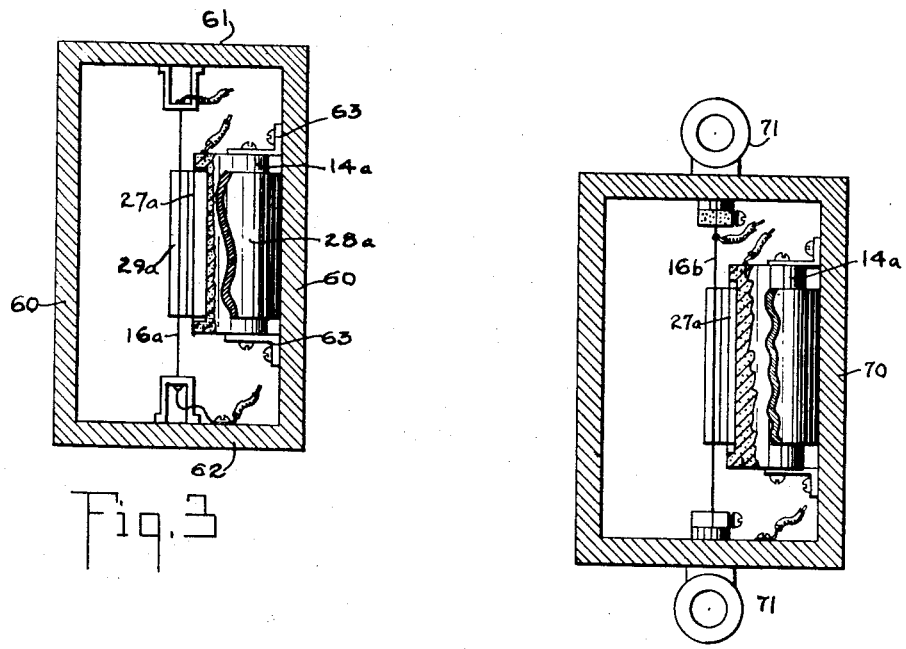
INVENTOR.
FRANK RIEBER
BY Patented July 4, 1950

2,513,678

UNITED STATES PATENT OFFICE 2,513,678

FREQUENCY CONTROLLED WEIGHING DEVICE

Frank Rieber, New York, N. Y., assignor to Interval Instruments, Inc., New York, N. Y., a corporation of New York Application January 29, 1944, Serial No. 520,203

2 Claims. (Cl. 73—141)

This invention relates to a weighing machine which, in view of the fact that it enables the indications to be transmitted to a distance, may appropriately be called a telescales.

It is an object of this invention to provide a device in which the indications may be made with unusual accuracy, free from errors arising from the tensioning of springs, or from friction or temperature, or other inaccuracies within the device.

In a copending application for transducers filed of even date herewith and bearing Serial No. 520,196, which is now Patent 2,469,785, I have disclosed an apparatus in accordance with which the tension upon a wire is caused to change the natural frequency of vibration of that wire so that these two qualities are mutually translatable either into the other. In another copending application for oscillating systems filed of even date herewith and bearing Serial No. 520,197, which is now abandoned, I have shown this principle used in determining the period of oscillation of an oscillating system, whereby the frequency is generated bearing an accurate correspondence to the wire tension, which may in turn be interpreted in terms of the wire tension by a correspondingly accurate determination of the frequency.

In accordance with this invention, I have applied these principles to the construction of a scales.

It is a further object of this invention, therefore, to provide an indication of weight which may be transmitted to a distance and there interpreted either by visible indication or by the performance of some controlling action or otherwise, without inaccuracies incident to the transmission or to the amplification. It is a further object to provide an instrument which when standardized will retain its standardization indefinitely, and hence which can be relied upon accurately to determine weight.

The invention accordingly comprises a device possessing the features, properties and the relation of elements which will be exemplified in the articles hereinafter described and the scope of the application of which will be indicated in the claims.

For a fuller understanding of the nature and objects of the invention, reference should be had to the following detailed description, taken in connection with the accompanying drawings, in which:

Figs. 3 and 4 are sectional views of embodiments for measuring very heavy compressions and tensions respectively.

Figures 1, 2:
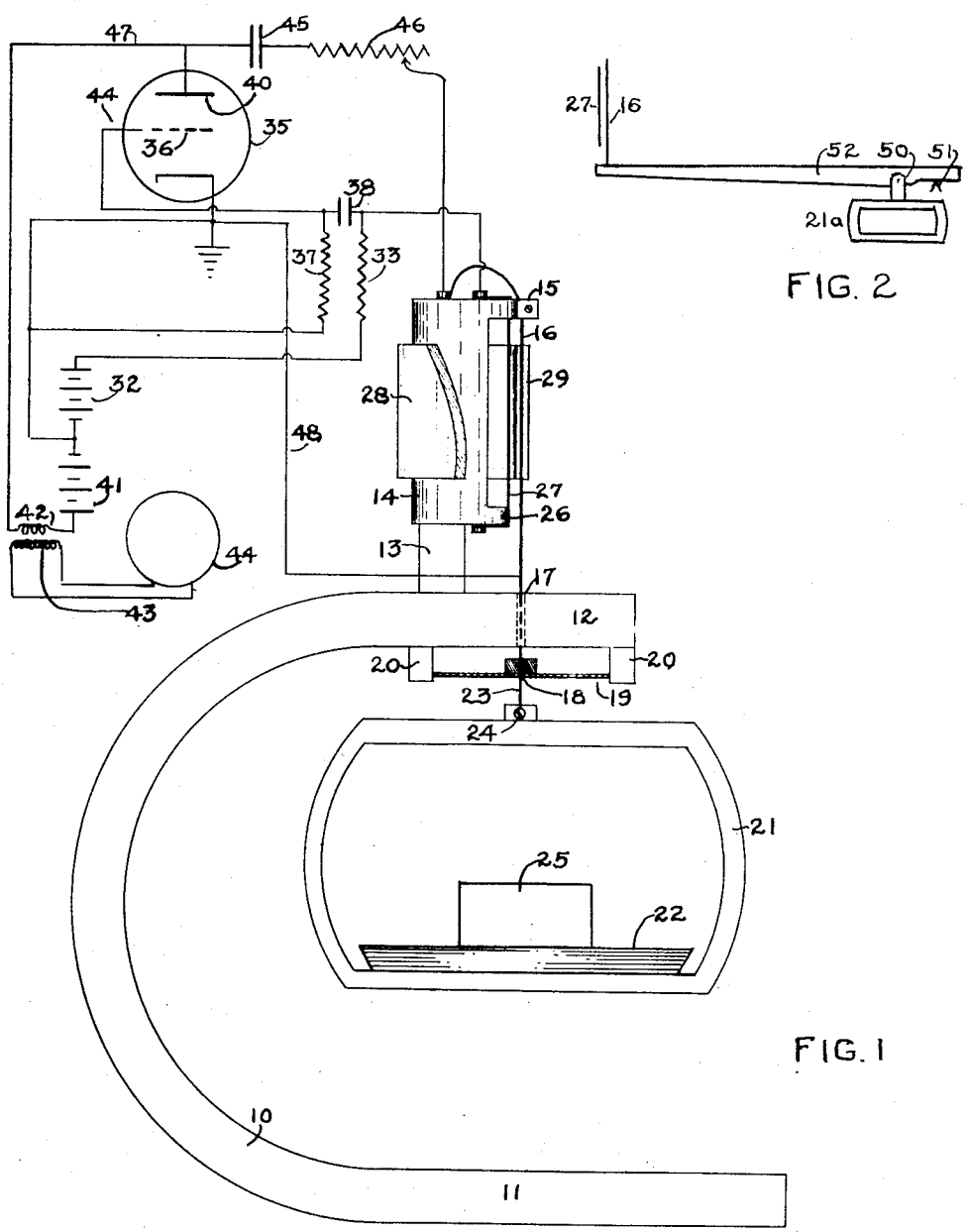
Fig. 1 shows an apparatus made in accordance with this invention.
Fig. 2 is a fragmentary side elevation of a modified form of the device for weighing heavier weights.

In the drawings the numeral 10 designates a framework having a base 11 adapted to rest upon a table or the like, and an overhanging portion 12 for supporting the weight-sensitive mechanism. Extending upwardly from this portion 12 is an upright 13 carrying an insulating member 14 of general cylindrical form, the axis of the cylinder being vertical, and at its top portion this member 14 carries a bracket 15 for supporting a depending wire 16 which serves as the vibrating member.

The wire 16 is carried through an opening 17 in the portion 12, and at its lower end is fixed at 18 to the center of a diaphragm 19, which latter in turn is attached to brackets 20 upon the portion 12. Connections are made between the center 18 of this diaphragm and a frame 21 for supporting the scale pane 22. This connection may conveniently be made by extending the wire 16 below the diaphragm, as shown at 23, to be attached to the frame at 24.

With the foregoing construction it will be clear that the tension in the wire 16, the tension in the diaphragm 19 being negligible, will be equal to the weight of the parts 21 and 22, plus the weight of any object 25 which may be put in the scale pan to be weighed. Thus all changes in the weight 25 will meet with accurately corresponding changes in the tension on the wire 16 and may be measured thereby.

Means are provided for supplying energy to the wire to keep it vibrating, comprising an oscillator circuit, and means are provided responsive to the frequency of the wire for determining the frequency of the oscillating system. Such a circuit is fully disclosed in my copending application for oscillating systems already referred to, but may here briefly be mentioned as follows:

Depending also from the bracket 15 and extending downwardly to a bracket 26 at the bottom of the insulator member, is a second wire 27 which is parallel to and closely adjacent to the wire 16, but insulated therefrom, and a permanent C-shaped magnet 28 has its poles 29 parallel to and on opposite sides of the wire 16 with its lines of force transverse to the plane of the wires 16 and 27.

The wire 27 has impressed upon it a voltage from a battery 32 through a resistance 33. Numeral 35 indicates an oscillating system conventionally shown in the form of a vacuum tube having a grid 36 connected to ground through some suitable source for maintaining its mean potential at the proper point, which is illustrated in the form of a grid leak 37. A condenser 38 connects the grid 36 with the wire 27. The plate 40 of the tube 35 is fed with electrical energy from a battery 41 through an impedance 42, which may take the form of a primary of a transformer, the secondary 43 of which is connected to a frequency meter 44.

Means are also provided for taking current from the plate circuit to flow through the vibrating wire 16 to maintain it in vibration, and this is here shown as a condenser 45 and a feed back limiting resistor 46 which are connected in series in a wire 47 which leads from the plate to the top of the wire 16, the bottom of the wire being connected to ground by a conductor 48. The electrode 27 and wire 16 form a condenser which is charged by battery 32. The charge varies with the variation in the capacity caused by oscillations in the wire, which imposes a pulsating potential on the grid 36. The resulting plate current is fed through the wire 16 through resistance 46 and condenser 45.

With the above construction it will be clear that the weight imposed in the pan 22 will vary the tension upon the wire 16 by precisely its own weight, since it will be understood that the diaphragm 19 is not under tension and is very thin. Moreover, it will be understood that there is no movement of the bottom of the wire, and hence no movement of the diaphragm except for the minute variation due to its stretching under weight.

It is for this reason that there is no need to make compensation for the tension in the diaphragm, the purpose of this diaphragm being solely to hold the lower end of the wire laterally in its proper position in the field of the permanent magnet and in proper relation to the wire 27.

The resonance of such a wire is extremely sharp, and it can be made still sharper if desired by placing it in a vacuum, and thus by proper calibration it may be made to indicate the weight with extreme sensitiveness.

We refer to the meter 44 as a frequency meter, since it is a meter responsive to changes in frequency. At the same time it will of course be understood, as disclosed in my aforesaid prior application 520,196, which is now Patent 2,469,785, that the scale readings of the frequency meter will ordinarily be made to indicate weight directly. In this manner, when a weight is placed in the scale pan, its value may be determined almost instantly by the frequency meter without the necessity of waiting until balance scale comes to rest. Moreover, because of the sensitiveness of the wire to vibrate only at its own natural frequency and its refusal to function at all, if there be even minute departure from that frequency above or below, the instrument may be made extremely sensitive and accurate.

In the form of the invention disclosed in Fig. 2, the frame 21a is pivoted at 50 to a lever 52 bearing on a knife edge 51 and attached, at its other end, to the wire 16. The operation of this embodiment is identical with that of the preceding except that a much larger weight may be measured in the scale pan with the same size vibrating wire.

In the form of the invention disclosed in Fig. 3, there is provided a closed shell having side walls 60 and top and bottom 61 and 62, and between top 61 and bottom 62 is stretched the vibrating wire 16a. Mounted in the interior of the shell upon brackets 63 is an insulator 16a carrying the electrode wire 27a, and a permanent magnet 28a is supported with its poles 29a on opposite sides of the wire 16a, as in the previous modification.

This form of the invention is suitable for use in any position where heavy loads occur. For example, this device may be placed under the track of a railroad by making the side wall sufficient to withstand within their elastic limit the maximum weight to which they will be subjected. In such case the changes in tension on the wire 16a will accurately record the total weight which is being supported by the shell by recording the compression of the shell 60 in response to that weight. Where a plurality of such devices are placed under a track, the total weight of a train may be taken, being equal to the sum of the various weights of the various members.

In this embodiment it will be clear that the tension on the wire will slacken as the member 60 is compressed. The initial tension will therefore be the maximum to which the wire is to be subjected.

It will be understood that in this embodiment, as well as in the embodiment of Fig. 4, the vibrating wire and the electrode will be connected to a suitable oscillating system, such as that described in Fig. 1.

In the form of the device disclosed in Fig. 4, the frame takes the form of a link 70 having an eye 71 at each end. The stretched wire 16b is normally at its minimum tension. In this embodiment the link itself is under tension and it is so proportioned as to increase the tension of the wire 16b to its maximum during the stretching of the link by the maximum strain imposed, before the metal of the link reaches its elastic limit. For some purposes it may be desirable to employ spring material for the link.

In this embodiment it will be clear that the tension on the wire 16b is increased as a direct function of the strain to which the link is subjected, and accordingly the frequency of the resultant oscillating current may be measured and interpreted or read directly in terms of units of weight.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. A force measuring apparatus comprising an elastic casing having opposite walls adapted to yield toward and from each other under variations of load imposed thereon, an elongated vibratory element having its ends anchored to said walls respectively whereby the natural frequency of said vibratory element will vary proportionally to stresses imposed upon said walls, a take-off device adjacent to said vibratory element, a magnet adapted to react with said vibratory element, an oscillating circuit connected with said vibratory element under control of said take-off, and an indicator responsive to the frequency of vibrations of said vibratory element.

2. A device according to claim 1 in which the casing is sealed and the elongated element, magnet and take-off are completely enclosed within said casing.

FRANK RIEBER.

REFERENCES CITED

The following references are of record in the file of this patent:

UNITED STATES PATENTS

| Number | Name | Date |
|---|---|---|
| 1,995,305 | Hayes | Mar. 26, 1935 |
| 2,050,674 | Stover | Aug. 11, 1936 |
| 2,265,011 | Siegal | Dec. 2, 1941 |
| 2,302,895 | Root | Nov. 24, 1942 |

FOREIGN PATENTS

| Number | Country | Date |
|---|---|---|
| 105,798 | Australia | Nov. 10, 1938 |
| 155,854 | Great Britain | 1921 |
| 622,581 | Germany | Dec. 2, 1935 |